UNITED STATES PATENT OFFICE.

CHARLES S. IRWIN, OF MADISON, INDIANA.

IMPROVEMENT IN MANUFACTURE OF STARCH.

Specification forming part of Letters Patent No. 27,130, dated February 14, 1860.

*To all whom it may concern:*

Be it known that I, CHARLES STUART IRWIN, of Madison, in the county of Jefferson and State of Indiana, have invented a new and useful Improvement in the Manufacture of Starch from Indian Corn; and I do hereby declare the following to be a full and clear description thereof.

The different processes heretofore adopted for the manufacture of starch from Indian corn may be classified into two distinct methods. The one of these methods has consisted in or required the employment of acids, alkalies, or other chemical agents, and also that the grain be ground and fermented to effect the required separation of gluten from the starch and the proper production of the latter. With this method my improvement has no particular connection. The other method dispenses with the use of acids, alkalies, or other chemical agents, and the separation of the starch from the gluten is effected by steeping the corn in water heated to a temperature of from 70° to 140° Fahrenheit, such water being changed several times during the steeping process or applied in continuous or intermittent streams, and then grinding or levigating the corn with water heated to the temperature as above. This method was patented to Wm. Watt on the 30th June, 1857. To such mode of manufacturing starch from corn my present improvement relates.

The Watt method in practice, it has been found, is, under many circumstances, either totally inoperative or effects the result in an imperfect, unsteady, and unreliable manner, besides which, under the most favorable circumstances, the operation requires comparatively much time, and consequently it is necessary to keep larger quantities of corn in the steeps than is convenient. It also necessitates a prolonged acid fermentation, which injuriously affects the quality of the starch, and causes a most imperfect separation of the starch from the gluten, thereby diminishing the yield of the starch.

By my present improvements I obviate the above and other objections, and I am enabled at all seasons to produce in less time, with comparatively a smaller quantity of corn in the steeps at one time, the largest yield of starch from a given quantity of grain, and the best quality of starch heretofore produced from corn free from any acid or alkaline admixture, which peculiarly adapts it to its well-known use, either as an article of food or for the preparation of linen, both in the manufacture of the latter article and in the "getting up" of made linen articles after washing, by reason of the absence of all acid or alkaline properties in the starch.

To enable others to make starch from corn according to my improvements, I shall now describe particularly the manner in which the same is or may be carried into effect.

I employ for "steeps" iron-bound wooden tubs of, say, about eight feet in depth and diameter, (which is about the necessary size for steeping two hundred bushels of corn at a time,) with water-pipes communicating with a tank or boiler in which the water is heated, and arranged to convey the heated water to or through both the tops and bottoms of the tubs. In these steeps I place Indian corn or maize, spreading it in a uniform layer. I then introduce both below and above—*i. e.*, at the bottom and top—of the corn, through the pipes above named, water heated to an average temperature of 160° Fahrenheit, or at any other temperature not less than 145° and not more than 180°. The quantity of water in the steeps should be considerable, so that a large body of it—say about thirty inches in depth—lie above the corn. The corn thus immersed is permitted to remain in the steeps for about eight days, care being taken that the water should not fall much below the temperature here mentioned. To sustain an even temperature in the steeps, and to effect the removal of the water acidulated by the acid fermentation, I change the water from time to time, which, however, I have found need not to be oftener than once in twenty-four hours, or thereabout, the water preserving its high temperature by reason of the large quantity of it above the corn, and also by reason of the heat evolved by or during the fermentation of the corn. To change the water, it is let out through a spigot arranged at or near the bottom of the tub, and provided with a strainer on the inside to prevent the escape of the corn, and after this is done and the spigot closed fresh heated water is introduced, as before, to act both on the top and bottom of the corn in the steep and to permeate through it.

By thus proceeding the grains of corn are swollen and suitably prepared in a most effective and rapid manner for grinding. To grind the corn, it is conveyed to the millstones, of which two pairs are used, the one pair grinding coarse and discharging the crushed corn into the other pair of stones, which are dressed to grind fine. As in the Watt process, I prefer to grind with a current of heated water; but I find water heated as high as 120° Fahrenheit, or thereabout, to be best. The ground corn is discharged, in the shape of a watery pulp or mixture, onto sieves or strainers. I employ, for the purpose of separating the bran and gluten which is mixed up with the starch-globules, a series of sieves or strainers, arranged one above the other, with intermediate spaces and outlets, and each succeeding sieve being of a finer texture. The several sieves are secured in a frame, to which a jerking motion is communicated by an eccentric working about one hundred and eighty revolutions a minute. A shower of cold water, having a fall of about three feet to give it the requisite force, is applied to wash the starch from the corn through the sieves, and a suitable outlet provided below the sieves to catch and conduct the starch-water, while other outlets from the spaces between the several sieves serve to carry off the bran and some gluten and the fibrous parts of the starch-cells.

The starch-water, which, by the shower applied on the top of the first sieve, is made to trickle through the several fine and yet finer sieves, and collected by the outlet above mentioned in a trough, is, at this stage of the process, intimately mixed with and holds in suspension gluten and other matter foreign to the starch, and that cannot be easily separated by mechanical means. The plan heretofore adopted is protracted decantation, or allowing the starch to settle by virtue of its difference in specific gravity; but such method cannot be adopted without serious loss of starch, that remains embodied with the gluten, and is finally carried off with the water. Chemical agents have been employed to effect more perfect or complete separation. These agents consist of alkaline or acid solutions, such as soda, lime, potash, or muriatic acid; but these, besides requiring an after process and subsequent treatment by other chemical agents to neutralize their respective properties, will always be retained in sufficient excess—the one or the other—to prejudicially effect the product, as before mentioned.

To obviate waste in the product on the one hand, and to prevent the injurious use of chemicals on the other hand, is the object of the second part of my improvement. I have discovered that if the starch-water, charged with gluten and other matter foreign to the starch, be heated again to a temperature of about 60° Fahrenheit, or, say, ranging from 55° to 70°, and then be allowed gently to flow—that is, free from disturbing agitation—the starch will, during such gentle flow, entirely separate from the gluten, which remains supernatant and can be easily run off, while the starch will settle in the runs, and after the flow of water is stopped, being consolidated, may then be removed in lumps or cakes, or in the shape of a pasty matter, and be packed in boxes for sale in the market; or, previous to being packed, it may be submitted to a refining process by again diluting it in water and allowing the starch to separate from any impurities it may have gathered during the preceding operations. The separation of the starch and the gluten and the settlement of the former are effected substantially in the following manner:

I use a system of runs deriving their supply from a transverse or head trough or run, into which the starch-water is conveyed from the sieves. This head run is of any form or shape; but I preper to give it a V shape, the apex of which is lowermost. The runs proper may also be variously constructed. The simplest plan, however, is to give them a common bottom of from seventy to seventy-five feet long, the whole being inclined, but not exceeding a three-and-one-half-inch fall for the entire length. On this bottom are secured, eighteen inches apart, longitudinal partitions of about five inches high each, and which form the runs. These runs are further provided at their heads with transverse slats which constitute dams, over which the water is made to pass for the purpose of spreading the water and checking its velocity or equalizing the flow down the runs. Corresponding with each of the runs, the head run is provided with two or more openings, through which the starch-water is allowed to pass into the runs over the dams.

To give the necessary temperature to the starch-water in the runs, the head run may be heated by a current of warm water or steam-jacket, or the temperature may be adjusted by regulating the temperature of the water to the millstones, or of the supply of cold water to the sieves.

Having thus described my improvements and the manner in which the same are or may be carried into effect, I shall state my claims as follows:

1. In the manufacture of starch from maize or Indian corn, my improved method of treating the corn, preparatory to its being crushed and ground, by steeping the same in water heated to an average temperature of 160° Fahrenheit, or to any other temperature ranging between 145° and 180° Fahrenheit, said water being, as usual, changed from time to time, so as to maintain the requisite temperature and to remove the water acidulated by previous fermentation of the corn, substantially in the manner and for the purposes set forth.

2. In the manufacture of starch from maize or Indian corn by steeping the whole and uncrushed corn in water heated to a temperature of from 70° to 180° Fahrenheit, and by then grinding it with water heated to a temperature of from 70° to 140° Fahrenheit, the method herein described of effecting the separation of the starch from the gluten in a more perfect manner than this has been done heretofore by maintaining the temperature of the starch-water while in the runs at or heating the same previous or during the separation of the starch from the gluten to an average temperature of 60° Fahrenheit, or to any other temperature ranging between 55° to 70° Fahrenheit, substantially in a manner and for the purposes set forth.

In testimony whereof I have signed my name to this specification before two subscribing witnesses.

Washington, December 10, 1859.

CHAS. S. IRWIN.

Witnesses:
A. POLLAK,
EDM. F. BROWN.